United States Patent [19]

Gopp

[11] Patent Number: 4,936,276
[45] Date of Patent: Jun. 26, 1990

[54] LEARNING SYSTEM FOR IGNITION CONTROL

[75] Inventor: Alexander Y. Gopp, Ann Arbor, Mich.

[73] Assignee: Ford Motor Company, Dearborn, Mich.

[21] Appl. No.: 390,045

[22] Filed: Aug. 7, 1989

[51] Int. Cl.$^5$ .............................................. F02P 5/04
[52] U.S. Cl. ..................................................... 123/425
[58] Field of Search ............... 123/425, 426, 417, 406, 123/435; 364/431.05

[56] References Cited

U.S. PATENT DOCUMENTS

| | | |
|---|---|---|
| 4,026,251 | 5/1977 | Schweitzer et al. ................. 123/425 |
| 4,063,538 | 12/1977 | Powell et al. ........................ 123/425 |
| 4,379,333 | 4/1983 | Ninomiya et al. ............. 364/431.05 |
| 4,391,248 | 7/1983 | Latsch ................................. 123/425 |
| 4,466,405 | 8/1984 | Hattori et al. ....................... 123/425 |
| 4,481,925 | 11/1984 | Karau et al. ......................... 123/425 |
| 4,640,249 | 2/1987 | Kawamura et al. ................. 123/425 |
| 4,660,535 | 4/1987 | Asano .................................. 123/425 |
| 4,679,536 | 7/1987 | Morita ................................. 123/425 |
| 4,690,116 | 9/1987 | Takahashi ........................... 123/425 |
| 4,694,799 | 9/1987 | Yagi et al. ........................... 123/425 |
| 4,706,628 | 11/1987 | Trombley ............................ 123/425 |
| 4,760,825 | 8/1988 | Morita ................................. 123/340 |
| 4,774,922 | 10/1988 | Morita ................................. 123/425 |
| 4,829,962 | 5/1989 | Häfnor et al. ....................... 123/425 |
| 4,838,228 | 6/1989 | Yoneyama ........................... 123/425 |
| 4,848,299 | 7/1989 | Satoh et al. ......................... 123/425 |
| 4,856,480 | 8/1989 | Nakajima et al. ................... 123/425 |
| 4,867,124 | 9/1989 | Javahorian .......................... 123/425 |
| 4,875,450 | 10/1989 | Yoshikawa et al. ................ 123/425 |

Primary Examiner—Raymond A. Nelli
Attorney, Agent, or Firm—Allan J. Lippa; Peter Abolins

[57] ABSTRACT

A control system and method for optimizing power in a combustion cylinder of an engine. An ignition timing reference is offset during each learning interval. Differences in indicated mean effective pressure (IMEP) which result from the timing offset are calculated. When a determination is made that the offset timing reference is converging towards an optimal value, the timing reference is updated.

18 Claims, 5 Drawing Sheets

LEARNING SYSTEM FOR IGNITION CONTROL

BACKGROUND OF THE INVENTION

The field of the invention relates to a control system for maximizing power output of internal combustion engines. In particular, the invention relates to controlling the timing of combustion for maximizing engine torque output. Combustion timing may be controlled by controlling ignition timing in one embodiment and fuel timing in another embodiment.

It is known that optimal torque output, within acceptable emission limits, is achieved when ignition timing of an engine is set at "minimum spark for best torque (MBT)." The ignition timing of a particular model of motor vehicle is typically set or calibrated at a predefined spark advance before top dead center (TDC) such that the average of all such vehicles, when new, is near MBT. This approach however has been found to be less than optimal because variations among engines, subsequent maintenance, environmental conditions, and aging often result in an actual MBT which is different from the initial spark advance calibration. It is therefore desirable to have a control system which continuously maintains ignition timing at MBT.

Various approaches have been attempted to achieve MBT during vehicular operation. In one typical approach, pressure transducers are coupled to the combustion cylinders and the crank angle location of peak pressure (LPP) is compared to a reference. Allegedly, the reference is associated with MBT. It is further presumed that LPP always provides a measurement of MBT. Examples of these approaches are found in U.S. Pat. No. 4,063,538 issued to Powell et al, U.S. Pat. No. 4,391,248 issued to Latsch, U.S. Pat. No. 4,481,925 issued to Karau et al, U.S. Pat. No. 4,706,628 issued to Trombley and U.S. Pat. No. 4,760,825 issued to Morita.

A disadvantage of the above approaches is that actual LPP varies with changing operation conditions. That is, the correlation between MBT and LPP is not constant. It is therefore contented that a fixed reference value for LPP does not exist. Another disadvantage is that LPP does not always provide a measurement of MBT in such engines as engines with stratified fuel charges. Accordingly, these types of control systems have been found to be unsatisfactory.

Another approach aimed at achieving MBT is to change spark ignition timing and compare fluctuations in engine speed. Examples of this approach are found in U.S. Pat. No. 4,026,251 issued to Schweitzer et al, and U.S. Pat. No. 4,379,333 issued to Ninomiya et al. In U.S. Pat. No. 4,026,251 ignition timing is perturbed to one side of the reference for a predetermined sample time and engine speed measured. Ignition timing is then perturbed to another side of a reference value for a predetermined sample time and engine speed again measured. Ignition timing is then adjusted in response to the measured difference in engine speed. The inventor herein has recognized numerous disadvantages of this approach. For example, during the sample times, engine speed may vary as a result of changes in operational conditions such as while encountering inclines. Further, engine speed at a particular sample time is also related to engine time at a previous sample time due to inertial effects. Thus, changes, in engine speed are caused by more factors than the perturbation and ignition timing. Accordingly, an accurate measurement of changes in engine torque resulting from changes in ignition timing may not be obtainable. In addition, a predetermined number of samples must be taken at each ignition timing offset as determined by worst case analysis. Stated another way, each ignition timing decision, or correction, occurs at a fixed time interval which is determined by the worst case conditions under which such a decision may be made. These systems have therefore also been found to be unsatisfactory.

SUMMARY OF THE INVENTION

It is an object of the invention herein to provide a control system for optimizing engine torque by adjusting the timing of combustion events.

The problem and disadvantages discussed above are overcome, and object achieved, by providing both an apparatus and method for optimizing power output by updating a timing reference wherein cylinder combustion events are related to the timing reference. In one particular aspect of the invention, the method comprises the steps of: generating the ignition timing reference; generating learning intervals related in timing to the combustion events; offsetting the ignition timing reference during every other one of the learning intervals; calculating pressure differences in the cylinder each learning interval; providing an average value related to said pressure differences; determining whether the average value is converging; and updating the ignition timing reference in response to the determination steps at the end of the learning cycle.

An advantage of the above recited method, is that changes in output power are directly and solely related to the timing reference offset. More specifically, because a pressure difference is calculated once for each timing offset, the time interval is sufficiently short to prevent contribution by changes in vehicular operation. Further, each pressure measurement is independent of previous combustion events. Therefore, changes in output power are solely due to the last timing reference offset. Another advantage is that the timing reference is updated whenever the average pressure differences indicate convergence. Thus, updating occurs in the minimum required time rather than during a time associated with worst case analysis as in prior approaches.

BRIEF DESCRIPTION OF THE DRAWINGS

The objects and advantages described herein will be more fully understood by reading the description of the preferred embodiment with reference to the drawings wherein.

DESCRIPTION OF PREFERRED EMBODIMENTS

Figure 1:
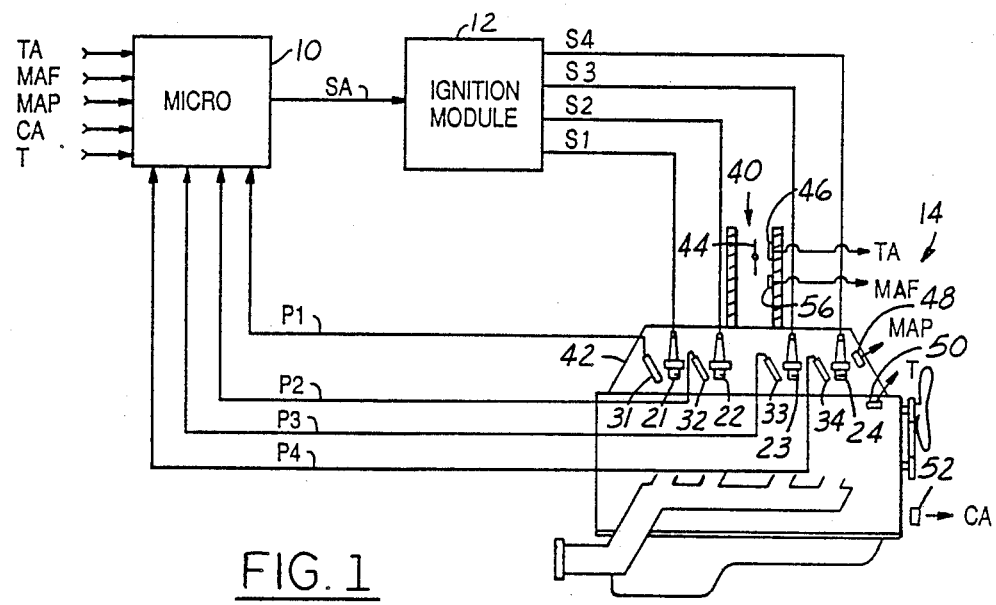
FIG. 1 is a block diagram of the system in which the invention is used to advantage.

An example of an embodiment in which the invention claimed herein is used to advantage is now described with reference to the attached figures. Referring first to FIG. 1, microcomputer 10 is shown controlling ignition module 12 in response to various measurements from engine 14. In this particular example, engine 14 is shown as a conventional 4 cylinder gasoline engine having spark plugs 21, 22, 23, and 24 each receiving electrical energy via respective signals $S_1$, $S_2$, $S_3$, and $S_4$ from ignition module 12. Each of the spark plugs 21, 22, 23, and 24 is coupled in a conventional manner to respective combustion cylinders 1, 2, 3, and 4 (not shown). Pressure transducers 31, 32, 33, and 34 provide microcomputer 10 with pressure signals $P_1$, $P_2$, $P_3$, and $P_4$ each related to the actual pressure in respective combustion cylinders 1, 2, 3, and 4. Air intake 40 is shown coupled to intake manifold 42 for inducting air past throttle plate 44 into the combustion cylinders.

Throttle angle sensor 46 is shown coupled to throttle plate 44 for providing throttle angle signal TA. Manifold pressure sensor 48 is shown coupled to intake manifold 42 for providing manifold absolute pressure (MAP) signal related to the manifold pressure in intake manifold 42. Temperature sensor 50 is shown coupled to engine 14 for providing temperature signal T. Crank angle sensor 52 is shown coupled to engine 14 for providing crank angle signal CA related to crankshaft position. Mass air flow sensor 56 is shown coupled to air intake 40 for providing mass air flow signal MAF related to the mass air flow inducted into engine 14. Those skilled in the art will recognize that either MAP sensor 48 or MAF sensor 56 may be used to provide an indication of engine load by known techniques.

It is noted that conventional components necessary for engine operation are not shown such as a fuel delivery system (either carbureted or fuel injected). Those skilled in the art will also recognize that the invention may be used to advantage with other types of engines, such as engines having a number of cylinders other than four.

Figure 2:
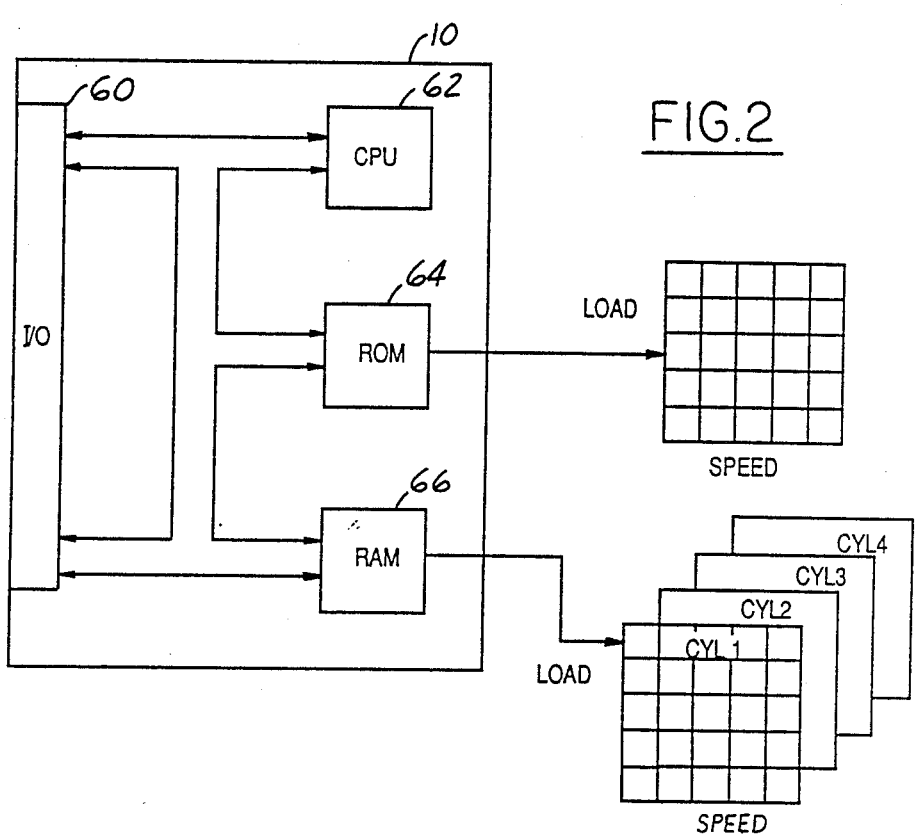
FIG. 2 is a representation of a portion of the embodiment shown in FIG. 1.

Referring now to FIG. 2, a block diagram of microcomputer 10 is shown including conventional input/output interfaces 60, central processing unit 62, ROM 64, and RAM 66. Ignition timing signals $SA_R$ are permanently stored in ROM 64 for providing base ignition timing at a desired crank angle position before top dead center (TDC) as a function of speed and load. RAM 66 provides trim signals ($SA_t$) to spark ignition timing signals $SA_R$ at the corresponding speed and load points for each cylinder. Engine speed information is calculated from signal CA and load information is calculated from signal MAP by microcomputer 10 in a conventional manner.

Figure 3:
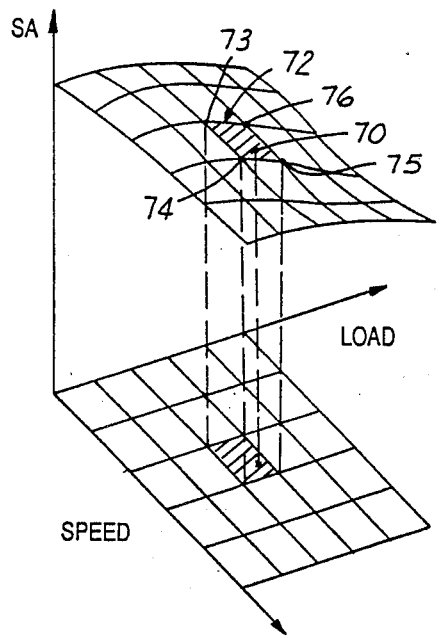
FIG. 3 is a graphical representation of look-up tables associated with the embodiment shown in FIG. 1.

Referring to FIG. 3, a three coordinate graph of a SA v speed v load which is applicable to either ROM 64 or RAM 66 is shown. For illustrative purposes, a hypothetical speed v load point (70) is shown within a square (72) defined by four stored SA signals (73, 74, 75, and 76). In response to a particular set of speed and load values (such as represented by point 70) microcomputer 10 calculates a SA signal by interpolation among the four values defined by the surrounding square (such as represented by points 72, 73, 74, and 75).

Figure 5:
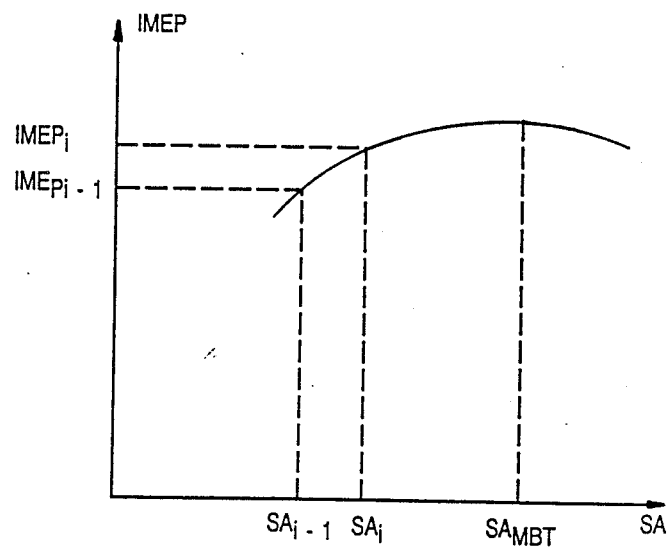
FIG. 5 is a graphical representation presented to help illustrate operation of the embodiment shown in FIG. 1.
Figure 4A:
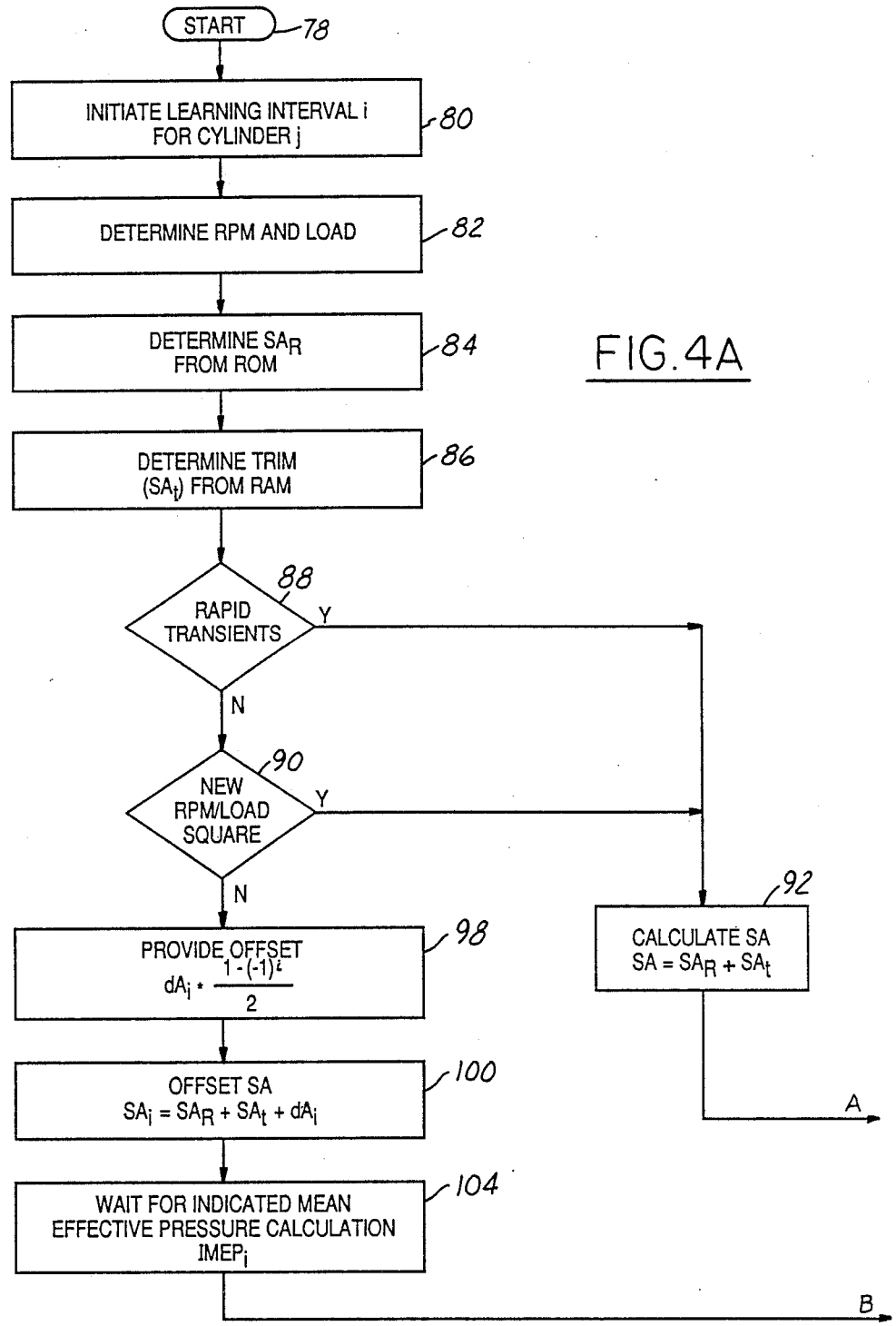
FIGS. 4A and 4B are a flowchart illustrating various process steps performed by a portion of the embodiment shown in FIG. 1.
Figure 4B:
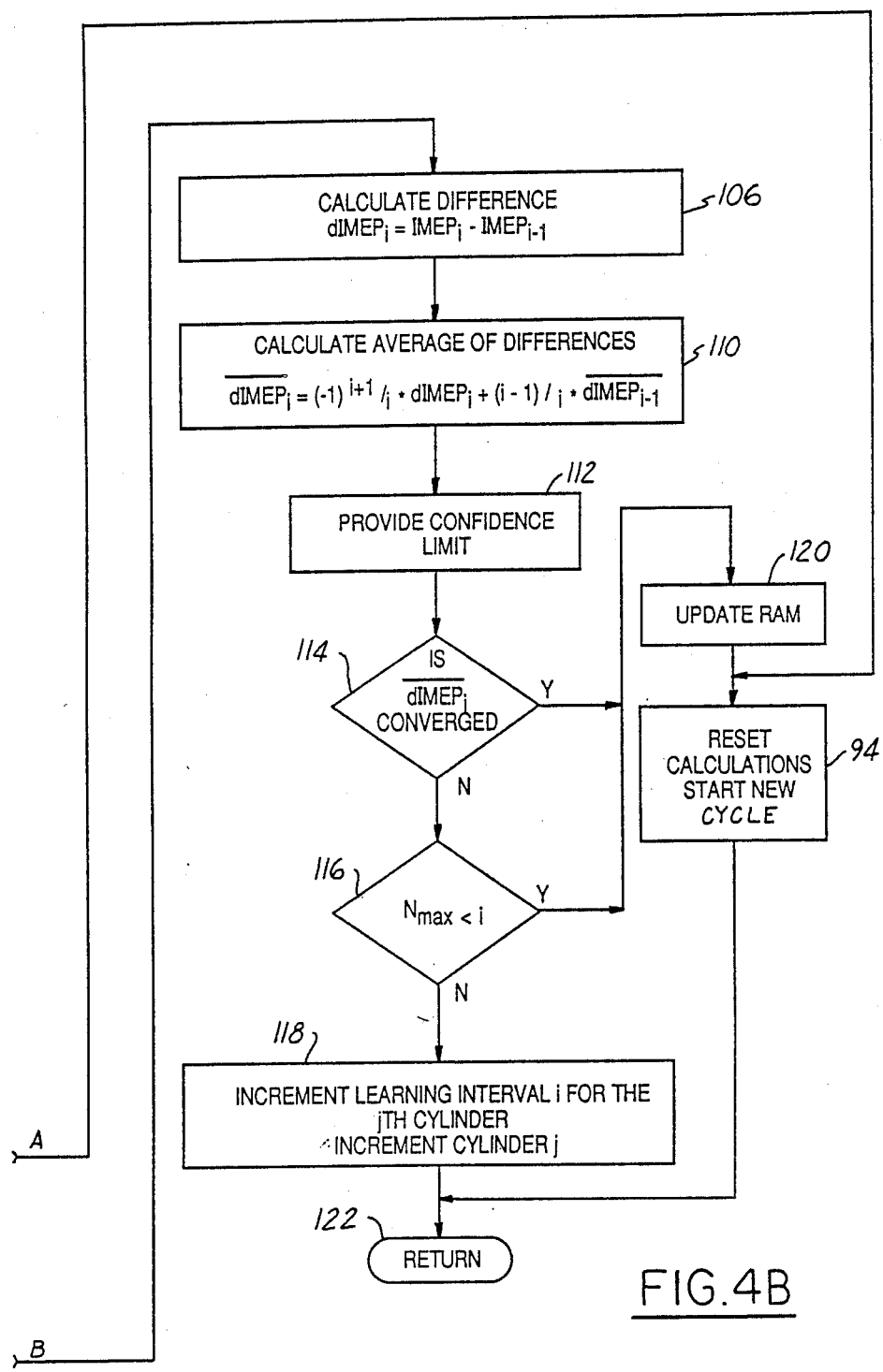

The operation of microcomputer 10 in controlling ignition timing signal SA for MBT is now described with particular reference to the flowchart shown in FIG. 4 and the associated MBT v SA curve shown in FIG. 5. The operations, or steps, described hereinbelow are performed separately for each cylinder (j) such that a separate, and corrected, ignition timing signal SA is provided to each cylinder.

At the start of each learning cycle, a test or learning interval i for a cylinder j is initiated (see steps 78 and 80). Engine speed and load are then computed in a conventional manner from crank angle signal CA and signal MAP (see step 82). During step 84, ignition timing signal $SA_R$ is determined by look-up and interpolation from ROM 64 storage. In a similar manner, ignition timing trim signal $SA_t$ is determined by look-up and interpolation from RAM 66. Engine parameters, including throttle angle signal TA, are then monitored to determine whether there are any rapid transients (see step 88). During step 90, engine speed and load are monitored to determine whether they are still within the square of ROM 64 defined by the four SA memory locations which surround the original speed and load points. In the event of either rapid transients or a new square, the present learning cycle is bypassed and ignition timing is trimmed in the same manner that it is trimmed during engine control without a learning interval (see steps 92 and 94).

During step 98, a predetermined ignition timing offset $dA_i$ is provided for the $i^{th}$ learning interval of the $j^{th}$ cylinder. Ignition timing offset $dA_i$ is only provided for odd learning intervals, otherwise it is set to zero. In response, as shown by step 100, both the ignition trim signal $SA_t$ and ignition timing offset $dA_i$ are added to ignition timing signal $SA_R$ to generate offset ignition timing signal $SA_i$. Thus, the timing of spark energy applied to the $j^{th}$ spark plug is advanced to $SA_i$ (see FIG. 5). For the next learning interval, the ignition timing will return to $SA_{i-1}$.

As shown in step 104, the indicated mean effective pressure ($IMEP_i$) during the $i^{th}$ learning interval for the $j^{th}$ cylinder is calculated in response to the actual pressure measurement ($P_i$) for the $j^{th}$ cylinder. The difference in IMEP calculations between the previous and present learning intervals for the $j^{th}$ cylinder ($dIMEP_i$) is then calculated (see step 106) for the $i^{th}$ learning interval. During step 110, the average of these differences is determined ($\overline{dIMEP_i}$) utilizing an average calculation as follows:

$$\overline{dIMEP_i} = (-1)^{i+1}/i \cdot dIMEP_i + (i-1)/i \cdot \overline{dIMEP_{i-1}}$$

In step 112, a statisticl analysis is used to provide a desired confidence level in the above calculation. In this particular example, parametric statistical analysis is used. That is a number of positive and negative signs of $\overline{dIMEP}$ are counted during the learning cycle. When some preset number $N_{lim}$ of either positive or negative signs is reached, a decision is made that the desired confidence level is achieved and the above calculations have converged.

A determination of $\overline{dIMEP}$ convergence is then made during step 114. In one particular example, the number of signs in one direction $N_{lim}$ is set to 8, after which a correction of RAM 66 table is initiated. That is, the values in RAM 66 are increased to advance ignition timing for positive signs, and decreased to retard ignition timing for negative signs. The four surrounding memory values of the original engine speed and load point are updated by known extrapolation techniques.

The amount of correction is a function of the chosen confidence level. That is, at a lower confidence level a smaller correction to RAM 66 is provided than when the confidence level is set high. In this example, a correction of +1 CA degrees is made to advance RAM table 66, and −2 CA degrees is made to retard RAM 66 table.

During step 116 a decision is made to prevent the learning system from searching for prolonged periods under conditions in which a decision cannot be made. For example, prolonged searching may occur when the MBT curve is excessively flat, or when there is a large variance in IMEP due to engine operating conditions. In this example, the number of learning intervals is compared to a predetermined number $N_{max}$ such as, for example 50 learning intervals for the confidence level corresponding to $N_{lim}=8$. When an indication of excessive searching is provided, RAM 66 is retarded during step 120 as previously described herein. After RAM 66 is updated, all the calculations provided by the previously described steps are reset and a new learning cycle is started (see step 94).

When there is no indication that either $\overline{dIMEP}_i$ has converged or that the maximum number of learning intervals $N_{max}$ has been reached, the learning interval i is incremented for the $j^{th}$ cylinder. Stated another way, the next time a learning interval is called for the $j^{th}$ cylinder, that learning interval will be incremented by one and the process steps described above repeated for the $j^{th}$ cylinder. Cylinder j is also incremented such that the process steps described above are performed for the next cylinder (see step 118 and 120).

In accordance with the above description, ignition trim signal $SA_t$ is updated at different speed and load points in RAM 66 for each of the cylinders. Therefore, ignition timing for each cylinder will be operated near MBT regardless of vehicular aging, maintenance performed, and variations in initial manufacturing tolerances.

Figure 6:
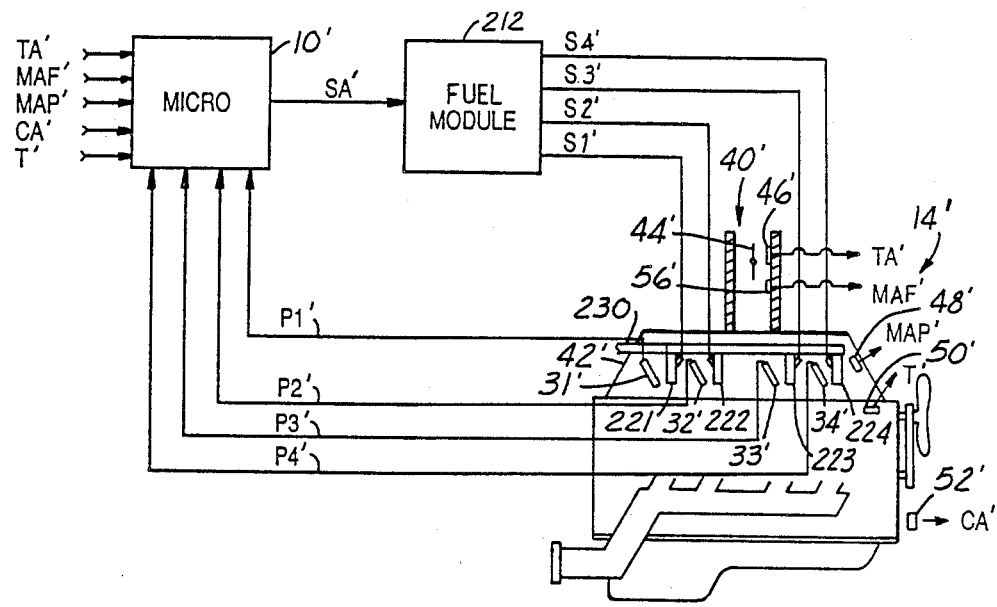
FIG. 6 is a block diagram of the system in which another embodiment of the invention is used to advantage.

Referring now to FIG. 6, an alternate embodiment is shown wherein like numerals refer to like parts shown in FIG. 1. In general terms, the invention is practiced in the embodiment shown in FIG. 6 by controlling the time duration of fuel injection, rather than by controlling ignition timing. More specifically, engine 14' is shown including fuel injectors 221, 222, 223, and 224 coupled to fuel rail 230. Each fuel injector is electronically actuated by respective signals $S_1'$, $S_2'$, $S_3'$, and $S_4'$ from fuel module 212. In this particular example, fuel module 212 is responsive to signal SA' from microcomputer 10'. The operation of microcomputer 10' in controlling fuel module 212 and engine 14' is substantially the same as described previously herein with respect to FIGS. 1-4.

This concludes the description of the preferred embodiment. The reading of it by those skilled in the art will bring to mind many alterations and modifications without departing from the spirit and the scope of the invention. The invention may be used to advantage by controlling any engine parameter upon which combustion events are dependant such as ignition timing or the timing of fuel injection. Accordingly, it is intended that the scope of the invention be limited to only the following claims.

What is claimed:

1. A method for optimizing power in an internal combustion engine having cylinder combustion events related to a timing reference, comprising the steps of:

offsetting the timing reference;

calculating pressure differences in the cylinders between successive combustion events resulting from said offsetting step; and updating the timing reference when said pressure differences indicate said offset timing reference converges towards a value associated with optimal power.

2. The method recited in claim 1 further comprising the step of applying electrical ignition energy to the cylinders in response to the timing reference.

3. The method recited in claim 1 further comprising the step of applying fuel to the cylinders in response to the timing reference.

4. The method recited in claim 1 wherein the timing reference is related to engine speed and engine load.

5. A method for optimizing power output in a multicylinder internal combustion engine by updating an ignition timing reference wherein cylinder combustion events are related to the ignition timing reference, comprising the steps of:

generating said ignition timing reference;

generating test intervals related in timing to said timing reference;

offsetting said ignition timing reference during every other one of said test intervals;

calculating pressure differences in each cylinder between successive test intervals;

averaging said pressure differences;

determining whether said average value is converging; and updating said ignition timing reference in response to said determination step.

6. The method recited in claim 5 wherein said step for generating said timing reference further comprises the step of addressing stored values of timing references as a function of engine speed and engine load.

7. The method recited in claim 5 further comprising the steps of measuring actual pressure in each of the cylinders during said test intervals.

8. The method recited in claim 7 further comprising the step of calculating indicated mean effective pressure in each cylinder in response to said pressure measuring step and wherein said step of calculating pressure differences comprises calculating differences in said indicated mean effective pressure between said test intervals.

9. A method for optimizing power output in a multicylinder internal combustion engine by updating an ignition timing reference wherein cylinder combustion events are related to the ignition timing reference, comprising the steps of:

providing said ignition timing reference from stored values in response to an indication of engine speed and engine load;

generating test intervals for each of the cylinders related in timing to a combustion event;

offsetting said ignition timing reference during every other one of said test intervals for each of the cylinders;

calculating pressure differences in each of the cylinders between successive ones of said test interval;

providing an averaged value related to said pressure differences for each of the cylinders;

determining whether each of said averaged values is converging; and updating said stored values of ignition timing references for each of the cylinders in response to said determination step.

10. A method for optimizing power in a combustion cylinder of an internal combustion engine wherein each combustion event is related to a timing reference, comprising the steps of:

generating learning intervals related in time to said timing reference;

offsetting said timing reference during one of said learning interval such that said timing reference is offset in time from said timing reference during a previous one of said learning intervals;

calculating differences in pressure generated by said cylinder between said learning interval and said previous learning interval;

indicating in response to said pressure difference calculation when said offset timing reference converges towards a value associated with optimal power; and updating said timing reference when said convergence is indicated.

11. The method recited in claim 10 further comprising the step of applying electrical ignition energy to the cylinders in response to said timing reference.

12. The method recited in claim 10 further comprising the step of applying fuel to the cylinders in response to said timing reference.

13. A method for optimizing power in each combustion cylinder of a multi-cylinder internal combustion engine wherein each combustion event in each cylinder is related to ignition power applied to a spark plug coupled to the cylinder, comprising the steps of:

generating a separate timing reference for each of the cylinders wherein the application of ignition power is responsive to said timing reference;

generating learning intervals related in time to said timing reference for each of the cylinders;

offsetting said timing reference during said learning interval such that said timing reference is offset in time from said timing reference during a previous one of said learning intervals;

calculating differences in pressure generated by the cylinder between said learning interval and said previous learning interval;

providing an indication of whether said offset timing reference is converging towards a value associated with optimal power, said providing step being responsive to said pressure differences; and updating said timing reference when said convergence is indicated.

14. The method recited in claim 13 wherein said step of calculating pressure differences further comprises the steps of:

measuring actual pressure in each of the cylinders during each of said learning intervals;

calculating mean effective pressure in each of the cylinders during each of said learning intervals in response to said measuring step; and calculating differences in said mean effective pressure in each of the cylinders.

15. An apparatus for optimizing power in a combustion cylinder of an internal combustion engine wherein each combustion event is related to a timing reference, comprising:

interval means for generating learning intervals related in time to said timing reference;

offset means for offsetting said timing references during said learning intervals such that said timing reference is offset in time from said timing reference during a previous one of said learning intervals;

calculating means for calculating differences in pressure generated by said cylinder between said learning interval and said previous learning interval;

indicating means responsive to said calculating means for indicating when said offset timing reference converges towards a value associated with optimal power; and update means for updating said timing reference when said convergence is indicated.

16. The apparatus recited in claim 15 further comprising energy mean for applying electrical ignition energy to the cylinders in response to said timing reference.

17. The apparatus recited in claim 15 further comprising fuel means for applying fuel to the cylinders in response to said timing reference.

18. An apparatus for optimizing power in each combustion cylinder of a multi-cylinder internal combustion engine wherein each combustion event in each cylinder is related to ignition power applied to a spark plug coupled to the cylinder, comprising:

generating means for generating a separate timing reference for each of the cylinders wherein the application of ignition power is responsive to said timing reference;

interval means for generating learning intervals related in time to said timing reference for each of the cylinders;

offset means for offsetting said timing reference during said learning interval such that such timing reference is offset in time from said timing reference during a previous one of said learning intervals;

calculating means for calculating differences in pressure generated by the cylinder between said learning interval and said previous learning interval;

indicating means responsive to said calculating means for providing an indication of whether said offset timing reference is converging towards a value associated with optimal power; and updating means for updating said timing reference when said convergence is indicated.

* * * * *